US 9,383,970 B2

United States Patent
Joy et al.

(10) Patent No.: US 9,383,970 B2
(45) Date of Patent: Jul. 5, 2016

(54) DISTRIBUTED ANALYTICS PLATFORM

(75) Inventors: Joseph M. Joy, Bangalore (IN);
Balasubramanyan Ashok, Bangalore (IN); Ganesan Ramalingam, Bangalore (IN); Sriram K. Rajamani, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 12/540,381

(22) Filed: Aug. 13, 2009

(65) Prior Publication Data
US 2011/0040808 A1 Feb. 17, 2011

(51) Int. Cl.
*G06F 17/30* (2006.01)
*G06F 9/44* (2006.01)

(52) U.S. Cl.
CPC ........................................ *G06F 8/20* (2013.01)

(58) Field of Classification Search
CPC .................................. G06F 17/30; G06F 17/00
See application file for complete search history.

(56) References Cited

U.S. PATENT DOCUMENTS

| | | | | | |
|---|---|---|---|---|---|
| 4,320,452 A | * | 3/1982 | Kempf | .................. | G06F 13/374 710/107 |
| 4,350,238 A | * | 9/1982 | Shah | ........................ | G07F 9/08 194/218 |
| 4,364,042 A | * | 12/1982 | Shiun | ....................... | H04Q 9/14 340/9.1 |
| 4,394,567 A | * | 7/1983 | Schonhuber | ........ | G01F 15/0755 235/375 |
| 4,402,045 A | * | 8/1983 | Krol | ...................... | H03M 13/13 712/29 |
| 4,403,306 A | * | 9/1983 | Tokushige | ............. | G11C 14/00 365/156 |
| 4,415,792 A | * | 11/1983 | Jordan | .................... | B23K 9/201 219/98 |
| 4,474,186 A | * | 10/1984 | Ledley | ..................... | A61B 3/02 600/546 |
| 4,520,452 A | * | 5/1985 | Loskorn | ................ | G06F 13/385 710/36 |
| 4,949,287 A | * | 8/1990 | Yamaguchi | ............. | G06T 11/60 400/61 |
| 5,177,796 A | * | 1/1993 | Feig | ........................ | H04N 19/98 375/E7.026 |
| 5,255,031 A | * | 10/1993 | Ikenoue | .................... | G03B 7/24 355/40 |
| 5,402,394 A | * | 3/1995 | Turski | .................... | H04J 3/0664 368/10 |
| 5,607,305 A | * | 3/1997 | Andersson | ............. | A61C 9/002 433/213 |
| 5,712,996 A | * | 1/1998 | Schepers | ................. | G06F 8/445 712/216 |
| 5,729,755 A | * | 3/1998 | Turski | .................... | B82Y 15/00 455/307 |
| 5,733,126 A | * | 3/1998 | Andersson | ............. | A61C 9/002 433/223 |
| 5,832,194 A | * | 11/1998 | Braun | .................. | G11C 16/102 714/1 |

(Continued)

OTHER PUBLICATIONS

Ashok, B., Joy, Joseph, et al., "DegubAdvisor: A Recommender System for Debugging," ESED-FSE '09, Aug. 24-28, 2009, pp. 373-382. (10 total pages).*

(Continued)

*Primary Examiner* — Farhan Syed
(74) *Attorney, Agent, or Firm* — Alin Corie; Sandy Swain; Micky Minhas

(57) ABSTRACT

A platform that facilitates software application development, maintenance, and support includes a storage component that receives structured and unstructured data pertaining to at least one application subject to development, maintenance, or support and causes the structured and unstructured data to be stored in a distributed fashion over a plurality of accessible data repositories. The storage component causes the structured and unstructured data to be stored in the data repositories such that the structured and unstructured data is accessible through utilization of a common access format. An executor component executes an analytical process over the structured and unstructured data and generates a first dataset, wherein the storage component causes the first dataset to be stored in at least one of the plurality of accessible data repositories in a format that is accessible by front end analysis applications.

20 Claims, 5 Drawing Sheets

(56) References Cited

U.S. PATENT DOCUMENTS

| | | | | |
|---|---|---|---|---|
| 5,847,992 | A * | 12/1998 | Tanaka | G11C 11/5621 365/185.03 |
| 5,852,714 | A * | 12/1998 | Tseng | H04L 12/1868 709/229 |
| 5,881,380 | A * | 3/1999 | Mochizuki | G06F 17/30289 |
| 5,917,429 | A * | 6/1999 | Otis, Jr. | A61J 7/0481 340/309.16 |
| 6,058,087 | A * | 5/2000 | Tomita | G11B 20/1426 341/58 |
| 6,222,760 | B1 * | 4/2001 | Chang | G11C 16/102 365/185.01 |
| 6,708,188 | B1 * | 3/2004 | Bear et al. | |
| 7,020,697 | B1 * | 3/2006 | Goodman et al. | 709/223 |
| 7,284,124 | B1 | 10/2007 | Ginsberg | |
| 7,467,198 | B2 * | 12/2008 | Goodman et al. | 709/223 |
| 7,469,264 | B2 * | 12/2008 | Scanlan et al. | |
| 2001/0052108 | A1 | 12/2001 | Bowman-Amuah | |
| 2005/0005194 | A1 * | 1/2005 | Scanlan et al. | 714/13 |
| 2005/0281276 | A1 * | 12/2005 | West et al. | 370/411 |
| 2006/0143594 | A1 | 6/2006 | Grimaldi | |
| 2007/0074149 | A1 * | 3/2007 | Ognev et al. | 717/101 |
| 2008/0222734 | A1 | 9/2008 | Redlich et al. | |
| 2009/0012633 | A1 | 1/2009 | Liu et al. | |
| 2009/0012932 | A1 | 1/2009 | Romem et al. | |
| 2009/0210368 | A1 * | 8/2009 | Deo et al. | 706/20 |

OTHER PUBLICATIONS

Kim, Sunghun, et al., "Mmeories of Bug Fixes," ACM, SIGSOFT '06/FSE-14, Nov. 5-11, 2006, pp. 35-45.(11 total pages).*

Betterburg, Nicolas, et al., "Extracting Structural Information from Bug Reports," ACM, MSR'08, May 10-11, 2006, pp. 27-30. (4 total pages).*

Kagdi, Huzefa, Michael L. Collard, and Jonathan I. Maletic. "A survey and taxonomy of approaches for mining software repositories in the context of software evolution." Journal of software maintenance and evolution: Research and practice 19, No. 2 (2007): 77-131.*

Hassan, Ahmed E. "The road ahead for mining software repositories." In Frontiers of Software Maintenance, 2008. FoSM 2008., pp. 48-57. IEEE, 2008.*

Aoyama, Mikio. "Web-based agile software development." Software, IEEE 15, No. 6 (1998): 56-65.*

Liu, et al, "Distributed, High-Performance Earthquake Deformation Analysis and Modelling Facilitated by Discovery Net", Retrieved at <<http://www.allhands.org.uk/2006/proceedings/papers/683.pdf>>, pp. 1-4.

"ProteusTM", Retrieved at <<http://www.genologics.com/files/u2/PSProteusOverview.pdf>> pp. 1-6.

* cited by examiner

DISTRIBUTED ANALYTICS PLATFORM

BACKGROUND

Tools focused on software development are valuable for a variety of reasons, including but not limited to enabling faster development, reducing time to market, enabling generation of better products (e.g., in terms of security, reliability, performance, . . . ), reduction of cost of development and maintenance, etc. These tools generally, however, are relatively limited in scope.

For instance, modern software applications tend to be relative large and complex. Operating systems may have millions of lines of code, millions of users, and hundreds or thousands of individuals generating, revising, and maintaining such code. For large and small software applications alike, each software engineering activity must deal with a substantial amount of information. Software engineering activities can be or include defining and designing application requirements, development of software, testing, transfer of knowledge between developers and testers, maintenance and support, etc. Additionally, no software application is stand-alone, as new software projects often use code from existing applications. For instance, newly generated code may call existing Application Programming Interfaces (APIs), a developer may copy, evolve, or refactor existing code, and so forth. Furthermore, newly generated code is typically legacy code in a relatively short period of time. Accordingly, with respect to software development, support, and maintenance, project teams must plan for effective management of information about code and data—otherwise, information overload can occur. Thus, ability to manage and exploit large amounts of information effectively is paramount to the success of legacy software applications as well as newly generated applications.

Conventionally, applications that are configured to manage information in connection with software development, maintenance, and/or support are customized applications that utilize proprietary formats. For instance, to effectively employ an application that analyzes software bug reports, a format for the bug reports must be known and enforced. Thereafter, the application can analyze data to ascertain relationships between bugs. These learned relationships, however, are not easily shared with other developers. Moreover, the learned relationships may not be in a format that is known by other developers.

SUMMARY

The following is a brief summary of subject matter that is described in greater detail herein. This summary is not intended to be limiting as to the scope of the claims.

Described herein are various technologies pertaining to a computing platform that facilitates software development, maintenance, and/or support. The platform can include distributed storage that can retain data in manner that it can be uniformly accessed. For instance, the platform can be configured to retain data such that a common querying or processing format can be employed when accessing and/or processing such data. Pursuant to an example, structured and unstructured data can be received, wherein unstructured data can include data such as email and word processing documents, and structured data can include data such as bug reports, binaries, source code, and other suitable data. Schemas and/or forms may then be utilized to transform such data into data that is canonical in nature (e.g., can be accessed and processed in a uniform manner). Thus, data from various sources with various formats can be accessed and processed by different applications.

Additionally, multiple copies of data can be maintained in order to ensure that the data are always available for analysis (e.g., even if individual storage systems fail). Further, data can be versioned, wherein versioning can be undertaken based upon time, metadata included in received structured or unstructured data, etc. Additionally, accesses to data retained in the data repositories can be monitored to protect privacy of individuals that may correspond to the data and/or to ensure that an individual that desires to access the data has requisite access permissions.

Various analysis applications may be executed over the data retained in the data repositories. For example, an analysis application can be configured to access data in the data repositories and generate one or more relationship graphs that represent learned relationships amongst at least a subset of the data. Nodes in the relationship graphs can represent data objects and/or data structures and edges in the relationship graphs can represent relationships between data objects and/or data structures, wherein the edges can be weighted to indicate an amount of relation between nodes coupled by edges. In another example, the analysis application can be configured to generate relational tables or other suitable data structures. These relationship graphs and/or relational tables can be in a format that is accessible by front end applications (e.g., applications that interface with third party computing devices). Furthermore, the relationship graphs and/or relational tables can be versioned, multiple versions of such relationship graphs and/or relational tables can be retained, and the relationship graphs and/or relational tables can be subject to various privacy/security restrictions. The front end applications may execute algorithms over the relationship graphs and/or relational tables to generate desired output data that pertains to software development, maintenance, and/or support. Further, the output data can be accessed and utilized by other individuals/applications if desired. Moreover, algorithms can be configured to execute over the relationship graphs and/or relational tables to generate desired output data that pertains to software development, maintenance, and/or support in a computational cluster separate from front-end applications Other aspects will be appreciated upon reading and understanding the attached figures and description.

DETAILED DESCRIPTION

Figure 1:
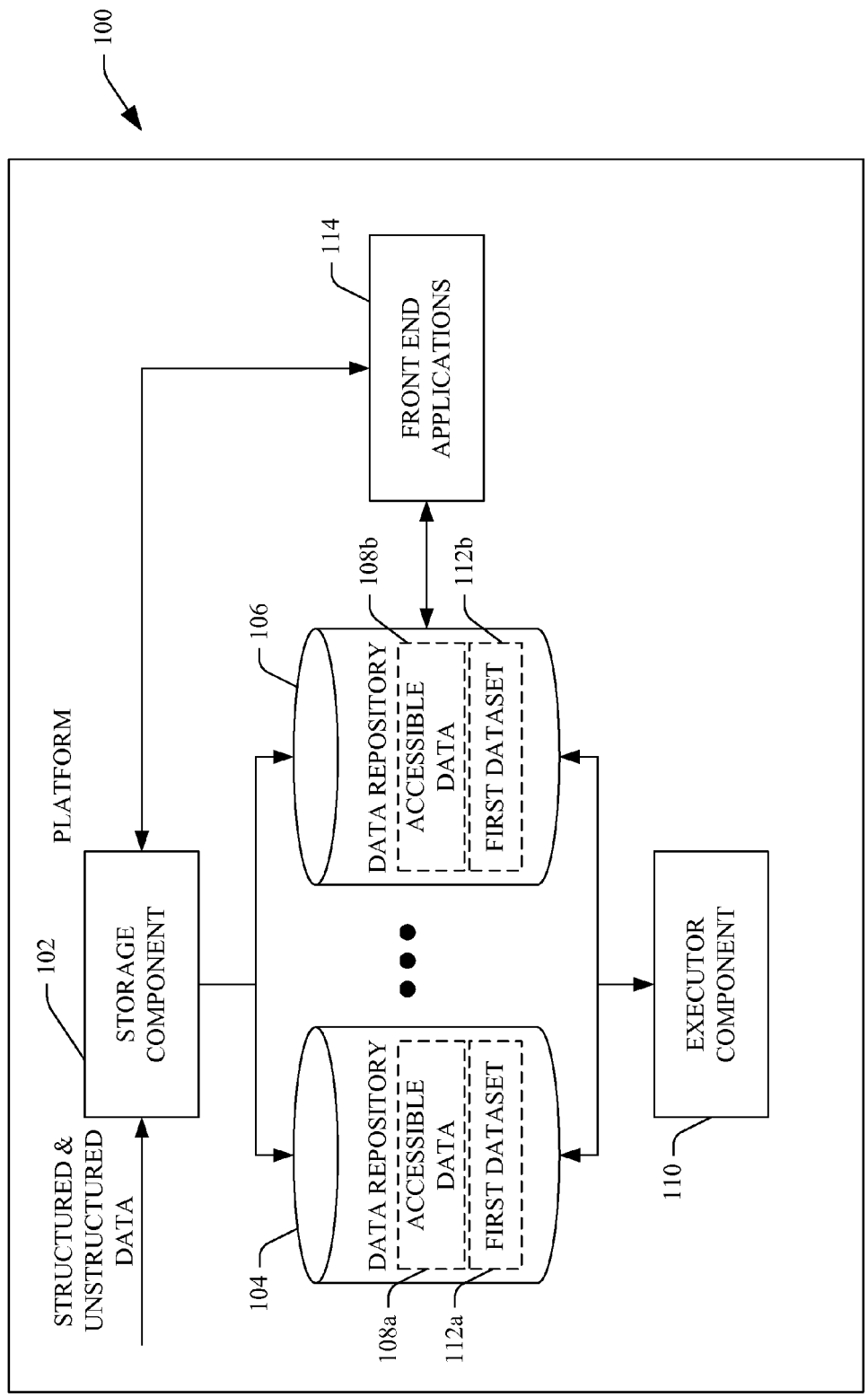
FIG. 1 is a functional block diagram of an example platform that facilitates software development, maintenance, and/or support.

Various technologies pertaining to a platform that facilitates software development, maintenance, and/or support will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example platform 100 that facilitates development, maintenance, and/or support of software application(s) is illustrated. The platform 100 includes a storage component 102 that can receive structured and unstructured data pertaining to at least one software application subject to development, maintenance, and/or support. It is to be understood, however, that the storage component 102 can receive structured and unstructured data with respect to multiple applications. For instance, the structured and unstructured data can include data from numerous heterogeneous data sources. Thus, in an example, unstructured data may include email, word processing documents, etc., while structured data can include bug reports, stack dumps, source code (structured data with deep semantics), binaries, etc. Furthermore, a subset of the data received by the storage component 102 can be streaming in nature, such as instrumentation data pertaining to an application, operating system, or the like.

The platform 100 may also include a plurality of data repositories 104-106, wherein the data repositories 104-106 may be located at a processing center and/or distributed geographically (e.g., located in different countries). The storage component 102 can cause the structured and unstructured data to be stored in a distributed fashion over the data repositories 104-106. The storage component 102 can additionally cause the structured and unstructured data to be stored in a manner such that the structured and unstructured data is accessible through utilization of a common access format. For instance, the storage component 102 can cause the structured and unstructured data to be represented in a format that includes metadata that describes the data and a corresponding data structure that comprises related information. In another example, the storage component 102 can utilize one or more schemas and/or forms to cause structured and/or unstructured data to be stored in a format that facilitates uniform access regardless of origin of the data. In an example, bug reports commonly include several known fields, such as a bug ID (a numeric identifier), an assigned-to field that indicates to whom the bug has been assigned, a title of the bug, a description field that includes data describing the bug, a link field that links the bug report to auxiliary data, such as images, and/or links to other related bugs. A schema or form can be utilized to standardize format of such data. In any case, the storage component 102 can cause received structured and unstructured data to be stored in the data repositories 104-106 as accessible data 108a-b.

The platform 100 also includes an executor component 110 that executes an analytical process (e.g., an application that facilitates analyzing the structured and unstructured data) over a subset of the structured and unstructured data and generates a first dataset 112a-112b that can be distributed across the data repositories 104-106 and/or stored in a particular data repository. Furthermore, the first dataset 112a-112b can be structured in a format that is readily accessible by front end analysis applications 114 (e.g., third party analysis applications). Example front end analysis programs will be described in greater detail herein.

Pursuant to an example, the executor component 110 can execute static and/or dynamic analysis of the subset of the structured and/or unstructured data that is retained in the data repositories 104-106. For instance, the executor component 110 can access the subset of the structured and/or unstructured data and generate a relationship graph that represents relationships in the structured and/or unstructured data. Nodes in the relationship graph can represent data objects/data structures while edges can represent relationships between data objects/data structures. Furthermore, the edges can be weighted to indicate strength of relationship between data objects/data structures. In another example, the executor component 110 can access the subset of the structured and/or unstructured data and can generate a relational table. The relationship graph and/or relational table can be employed by the front end analysis applications 114, which can access the relationship graph and/or relational table and perform analysis thereover.

Furthermore, the executor component 110 can utilize a distributed computation platform such as the DRYAD platform in connection with executing analysis applications over the structured and unstructured data and/or the relationship graphs and/or relational tables. Thus, the executor component 110 can perform distributed computing in connection with analyzing data stored in the data repositories 104-106. Applications written for DRYAD are generally modeled as a directed acyclic graph (DAG), which defines dataflow of applications. Vertices of the DAG define operations that are to be performed on the data. Additionally, DRYAD defines a domain-specific library (which may be implemented via a C++ library) that can be used to create and model a DRYAD execution graph. Of course, other techniques and technologies are contemplated for enabling parallel executing of analysis applications over data retained in distributed data repositories.

The platform 100, which as noted above utilizes a common access format in connection with retaining structured and/or unstructured data and relationship graphs as well as relational tables, can be employed in connection with building tools that can merge program analysis, statistical techniques (e.g., machine learning), belief propagation, and information retrieval techniques. Further, visualization application(s) can be employed to visualize data and/or relationships amongst data. Moreover, as will be described in detail below, data can be versioned and backed up in the data repositories 104-106, which can enable sharing of computed data across applications. Thus, the data repositories 104-106 can retain multiple copies of data such that the data remains available if individual storage systems fail. Additionally, various privacy and security constraints can be enforced.

Various example problems that may occur in the course of developing, maintaining, or supporting a software application that can be addressed through utilization of the platform 100 are now provided. For instance, a static analysis tool may be employed to locate five thousand defects in a particular build. It is desirable to prioritize such defects, as not all defects may be addressable in a short period of time. Accordingly, how particular defects affect the end-user experience with the software and likelihood of particular defects affecting the end-user experience with the software is desirably understood. The data repositories 104-106 can include static analysis data and usage data from use of the software, and such data can be correlated through utilization of a correlation application as the static analysis data and usage data is retained in a common access format.

In another example, a software developer may wish to alter a critical function, but may first like to know if such an alteration may cause problems with third party applications that utilize a certain API (e.g., may cause an application compatibility issue in a later release of an application). Thus, the software developer wishes to analyze the code together with data pertaining to how existing third party applications utilize the API. Again, this type of data can be retained in the data repositories 104-106 and can be correlated.

In yet another example, it may be desirable to ascertain what defects in an application users of the application are encountering, and furthermore it may be desirable to ascertain that a certain static analysis tool or tools catch such defects. Accordingly, data from Watson dumps is desirably correlated with static analysis of source code of the application. The platform 100 can be employed to retain such data so that is readily accessible and correlated.

These issues are addressable through utilization of the platform 100, as the platform 100 can integrate multiple data sources and retain data therefrom in a common access format in the data repositories 104-106. There are a large number of data sources where information associated with software development resides (source code repositories, bug databases, test results, Watson logs/dumps, trace logs from runs, etc.). Furthermore, the executor component 110 can integrate multiple techniques from different areas in connection with generating datasets that can be used for purposes pertaining to software development, maintenance, and/or support. Thus, an individual skilled in program analysis can integrate statistical analysis techniques into their tools without having to build the statistical analysis techniques themselves.

With more detail pertaining to the storage component 102, such storage component 102 can be configured to receive data that is continuously imported/transmitted to the platform 100. As noted above, the received data can be of various types. Additionally, the storage component 102 can cause analysis results (including intermediate analysis results) to be to be persisted in the data repositories 104-106, where such analysis results can be accessed by one or more applications. Example types of analysis results include indexes and computed relationship graphs. Furthermore, analysis results can be versioned (as described below) to facilitate a stable end user experience while allowing for evolution of data and analysis techniques.

The data received by the storage component 102 can include updates to longer-lived logical entities that evolve over time. For instance, a portion of data received by the storage component 102 may be an update to an existing bug in a bug database or a change list identifying a new version of a set of files in a source code repository. Not all data pertains to longer lived entities: for example, individual crash dumps are one-off entities. It can also be recognized that data can be incredibly voluminous and may include duplicate information. Accordingly, the storage component 102 can filter out data prior to causing data to be stored in the data repositories 104-106 (e.g., may selectively sample input data, may extract a relatively small portion of data from received data, etc.). As indicated above, received data may have some structure that is associated therewith. For instance, a source code file can be considered to be a text file and/or may be interpreted as a set of functions in a certain programming language.

The storage component 102 may be or include pluggable importing modules that can convert input data into a common access format (e.g., canonical form). The access format may be a combination of queryable metadata and other data that can be accessed using a standard syntax, such as the LINQ syntax. Thus, for instance, a binary can be converted into metadata that describes a name of the binary, attributes derived from header files of the binary, and other suitable data that can be deterministically computed from the binary, while other data stored in the data repositories 104-106 may be or include binary code and/or data blocks.

The storage component 102 may also be configured to detect duplicates in received data. Thus, when the storage component 102 receives data, the storage component 102 can execute a search over data in the data repositories 104-106 that can be used in connection with determining how to compactly represent the newly received data based upon previously received data.

The storage component 102 may also receive data from one or more applications executed by way of the executor component 110, and may cause output data to be stored in the data repositories 104-106. For instance, applications executed by the executor component 110 can output data that have explicitly represented structure. In an example, the executor component 104 can cause an application to execute over data in the data repositories 104-106, wherein the application is configured to analyze binaries, source files, and other information represented in the data repositories 104-106 and output a large scale dependency (relationship) graph. The storage component 102 may then cause output of such program to be stored in one or more of the data repositories 104-106 (e.g., in a single repository or distributed across several repositories).

Moreover, the storage component 102 can cause these structured outputs to be versioned and referable by other applications. In an example, a certain application may use a computed entity-relationship graph to rank search results. In most cases, a particular version of such graph will be used, wherein the version was generated at some point in time by applying a particular algorithm on a certain set of raw data. The storage component 102 can be utilized to create and evaluate new versions of this graph using one or more techniques (e.g., new techniques). Once a new version of the graph has been shown to be stable and provide benefits without significant regressions, such new version of the graph can be updated so that other applications can utilize the graph.

In addition, the storage component 102 can cause data to be retained in particular portions of the data repositories 104-106, such that data pertaining to different applications can be logically separated from other data. The storage component 102 can restrict access to certain logical partitions (silos) of data depending upon user, time of day, day of week, etc.

With more detail pertaining to the executor component 110, the executor component 110 can be configured to execute one or more programs (potentially parallel programs) that operate on data (raw data or intermediate analysis data) retained in the data repositories 104-106. In an example embodiment, applications executed by the executor component 110 may be limited to reading data from and writing data to the data repositories 104-106 (e.g., the analysis applications may be restricted from reading data from other data sources or writing data to other data sources), and may execute with security restrictions that can further limit access to data within the data repositories 104-106 (e.g., by verifying accesses to namespaces). Furthermore, the executor component 110 can include a job scheduler (e.g., a globally aware job scheduler) that can select appropriate computation clusters based upon physical closeness to underlying data for a particular job. Furthermore, the executor component 110 can include a mechanism that facilitates injecting and updating applications executed by the executor component 110 and libraries corresponding thereto without violating security policies, as well as a mechanism for debugging such applications and libraries.

While not shown, the platform 100 may also include one or more analysis libraries that can include libraries pertaining to (but not limited to) call-graph construction algorithms that utilize a combination of source code and binaries (with debugging information), vector operations on high dimensional vectors, similarity detection algorithms (such as sub-graph similarity detection and self-synchronizing hash functions), theorem provers, amongst others. The libraries may also include visualization libraries that can be employed in connection with building the front end applications 114.

The front end applications 114 can be a variety of applications that locate various correlations in the accessible data 108a-108b and/or in the first dataset 112a-112b. The front end applications 114 can be designed and built by the operators of the platform 100 or by different parties. The front end applications 114 can access data retained in the data repositories 104-106 together with data stored elsewhere, can cause data to be stored in the data repositories 104-106 (so long as security/privacy restrictions are met), etc. Furthermore, the front end applications 114 can be in communication with the storage component 102, and the storage component 102 can cause data output by the front end applications 114 to be versioned, can cause multiple copies of the data to be created and retained, etc. Several example front end applications are described in greater detail below.

Figure 2:
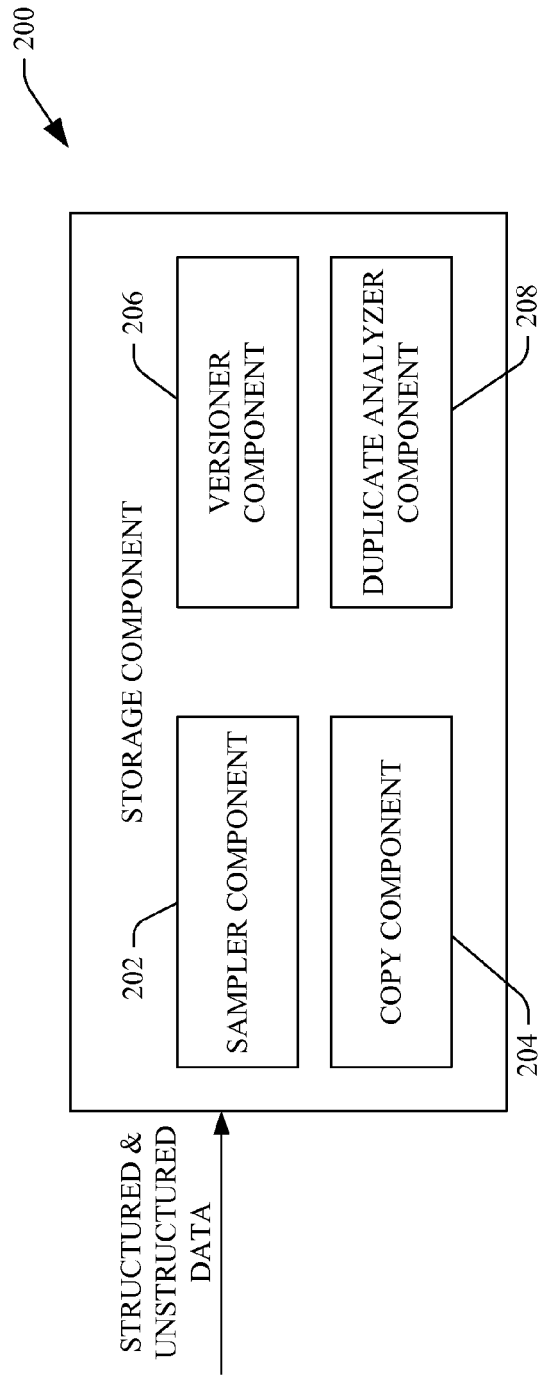
FIG. 2 is an example depiction of a storage component that can be included in an example platform that facilitates software development, maintenance, and/or support.

With reference now to FIG. 2, an example depiction 200 of content of the storage component 102 is illustrated. It is to be understood, however, that the storage component 102 can include more or fewer components (and functionality corresponding thereto) than what is shown in this Figure. The storage component 102 includes a sampler component 202 that can selectively sample/filter data that is desirably stored by the storage component 102. For instance, data received by the storage component 102 can be voluminous, and the sampler component 202 can be configured to selectively sample incoming data. Thus, the sampler component 202 can be configured to periodically, randomly, or pseudo-randomly sample certain types of data (e.g., instrumentation data pertaining to a certain application), the sampler component 202 can be configured to extract portions of data received thereby (e.g., certain fields of a data stream), or other suitable sampling/filtering. The sampler component 202 can be configured by an operator of the platform 100, can be automatically configured based upon current storage space and/or an amount of data currently being received, etc. Furthermore, the sampler component 202 can have different sampling settings for different types of data. Thus, the sampler component 202 may utilize a first sampling rate for sampling a first type of data and a second sampling rate for sampling a second type of data.

The storage component 102 may also include a copy component 204 that can automatically or semi-automatically cause multiple copies of data to be stored in the data repositories 104-106, such that the data is available even if portions of the storage system fail. The copy component 204 can be configured to create copies of the data periodically (e.g., nightly), as a background task when a threshold amount of processing resources are not utilized, or other suitable configuration.

A versioner component 206 can assign version information to raw data, data placed in a canonical format, data output by way of execution of an analysis application via the executor component 110 (FIG. 1), and/or data generated by the front end applications 114. As noted above, the executor component 110 can be configured to execute applications over raw data (in a format that is accessible by way of a common access format) and generate more rigidly structured data (relational tables, relationship graphs, etc.). As new data is received, the executor component 110 can be configured to update the relational tables and/or relationship graphs, and the versioner component 206 can assign version information to generated relational tables and/or relationship graphs. Additionally, front end applications can access structured data and output results pertaining to such structured data. The versioner component 206 can assign version information to results output by the front end applications to facilitate sharing of data and experimentation against data structures.

The storage component 102 can further include a duplicate analyzer component 208 that can analyze received data with data already retained in the data repositories 104-106 and locate duplicate/redundant data. For example, upon receipt of data from a data source, the duplicate analyzer component 208 can access the data repositories 104-106 in an appropriate logical location and analyze data retained therein. If the received data includes redundant/duplicate information from that stored in the data repositories 104-106, the duplicate analyzer component 208 can filter received data to remove duplicate/redundant information.

Figure 3:
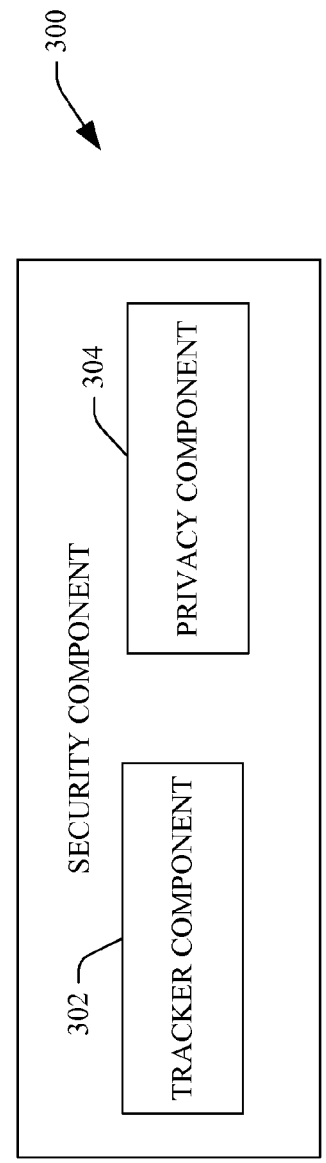
FIG. 3 is an example depiction of an executor component that can be included in an example platform that facilitates software development, maintenance, and/or support.

With reference to FIG. 3, an example depiction of a security component 300 that may optionally be included in the platform 100 (FIG. 1) is illustrated. The security component 300 can be configured to ensure that those wishing to access certain data retained in the data repositories 104-106 have requisite permissions and can also be employed to monitor privacy concerns pertaining to data in the data repositories 104-106.

For example, the security component 300 can include a tracker component 302 that tracks accesses to certain data in the data repositories 104-106 to ensure that an individual, company, and/or application has requisite permissions to access such data. Data received for storage by the storage component 102 and/or underlying data may have various levels of security and privacy considerations. For instance, source code files and design documentation may include intellectual property that may be desirably protected from accidental or deliberate disclosure outside a predefined group of people. Crash dumps may include personally-identifiable information such as passwords caught in a stack. Thus, as noted above, the data repositories 104-106 can include logically separate portions (silos), wherein transmission across silos may be restricted or forbidden. For instance, each product division within a company may maintain a silo, although smaller projects that may need different levels of isolation may have their own silos. The accessor component 302 can track accesses to data and allow data to be accessed/generated only if the individual/application accessing the data has requisite permissions. Accesses can be audited and maintained in a security log. Furthermore, within a silo, the security component 300 can maintain a single hierarchical namespace. When data is received, the accessor component 302 can assign a tag to a particular node in the namespace, wherein the namespace may be used to specify scope of queries (e.g., LINQ queries) to access the data.

Additionally, the accessor component 302 can maintain access control lists (ACLs) that can be placed on sub-trees in the namespace hierarchy. The ACLs can encode permissions of individual users and security groups to data within the platform 100. Typically, lower levels of the namespace have a one-to-one correspondence with some external-world hierarchy, such as a source control system branch and directory structures (or organizational structures), and the accessor component 302 can utilize this information to automatically assign ACLs (and keep the ACLs updated).

Furthermore, when an application is desirably executed by way of the executor component 104, and such application attempts to access a particular set of data, the accessor component 302 check to ensure that the user has the privilege to access that particular portion of the namespace (which can be specified in the query).

The security component 300 also includes a privacy component 304 that can ensure that data that is sensitive in nature is encrypted or removed prior to allowing a front end application to access the data. As noted above, crash dumps may include personally identifiable information, including passwords. The privacy component 304 can remove such passwords from the crash data or encrypt such passwords (or other data deemed to be sensitive).

Figure 4:
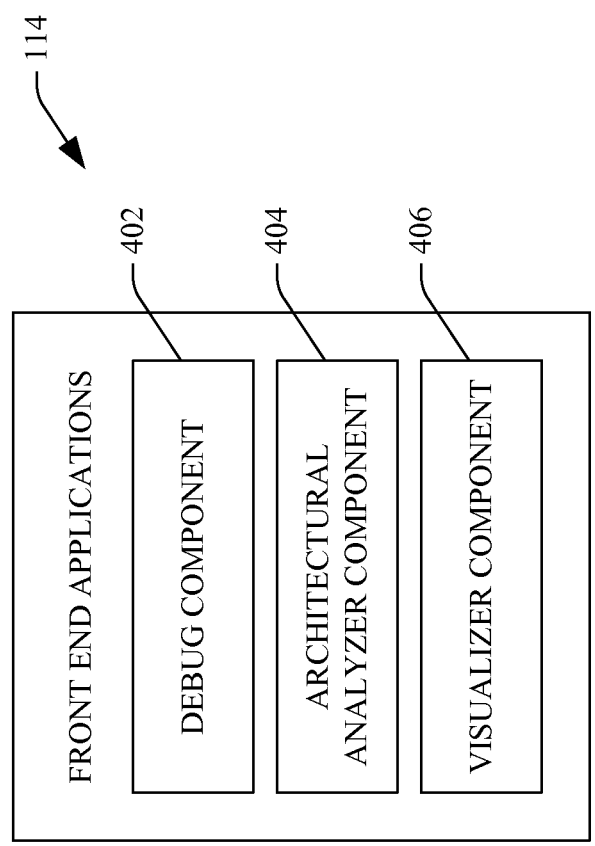
FIG. 4 is an example depiction of front end applications that can execute over data retained through utilization of a platform that facilitates software development, maintenance, and/or support.

With reference to FIG. 4, an example depiction of the front end applications 114 is illustrated. The front end applications 114 include a debug component 402 that can be utilized in connection with monitoring bugs during maintenance of a software application. Often, a bug that is currently being investigated is related to other bugs that have been investigated and resolved in the past or other bugs that are currently being investigated. The debug component 402 can be configured to receive a query where the query includes all or a portion of a context of a bug of interest. The debug component 402 can match the query with bug data in the data repositories 104-106 and return a ranked set of bugs that are similar to the query. In an example, the debug component 402 can utilize a matching algorithm that takes into consideration structure of queries—e.g., a special stack-track matching heuristic can be used to locate documents that have similar stack-traces to ones in the query. Information retrieval techniques such as term frequency and inverse document frequency may be used in connection with ranking documents (bugs).

Furthermore, the debug component 402 can be configured to build a relatively large relationship graph that relates each bug in the bug repository to source-code check-ins, changed functions, changed source files, individuals who change those functions, etc. The debug component 402 can further navigate the graph to return source files, functions, and individuals that are related to the query issued by the individual.

In another embodiment, the debug component 402 can automatically identify root causes of bugs. The debug component 402 can collect path profiles from a large number of tests retained in the data repositories 104-106. Path profile data can be collected over several runs, and the debug component 402 can use a statistical model to reveal path segments that are likely causes of failures. The path profiling is done by profiling paths in runs with low overheads.

The front end applications 114 may also include an architectural analyzer component 404. Conventionally, there is no suitable mechanism to provide to a developer a high-level overview of code at the architecture level—how pieces of the code fit together at an abstract level. Initially, a developer typically has a model regarding how the software should behave—how parts of the software should act together. As the software evolves, developers may lose faith in the model and/or would like to know if some portions of the code are in violation of principles upon which the application was built. This problem is exacerbated when code runs over different machines. The architectural analyzer component 404 can analyze contents of the data repositories 104-106 and output a visualization of an architecture of a particular software project.

The front end applications 114 may further include a visualizer component 406 that can output a high-level visualization of complex software. The visualize component 406 can allow a user to zoom in or zoom out over an architectural diagram so that the user can view different levels of resolution. For instance, what may be an abstract function block at a first level of resolution may be enlarged to show particular function calls at a more granular level of resolution.

Of course, the front end applications 114 may include any suitable number or type of application that can execute over data in the data repositories 104-106 (either raw data or more structured data generated via the executor component 110). Other example applications may be utilized in constructing usage protocols that describe how client code uses an API. Such an application can analyze traces (generated via static or dynamic analysis of client code) using data mining techniques and produces usage rules such as "for all locks x, release(x) is preceded by acquire(x)". For instance, such an application can mine a class of rules called Quantified Binary Temporal Rules with Equality Constrains that can represent binary temporal constraints between events with quantifiers to parameterize the arguments of events and equality constraints to constrain arguments of the events (such as pointer value not equal to null, or return value equal to −1). Such an application can generate interface usage documentation of an API from a body of client code that uses the API.

Another example application can be configured to locate information flow vulnerabilities in web applications via probabilistic inference. Yet another example application can be configured to recommend APIs to a client developer by building call graphs of a library and using statistical analysis of the call graphs to find API methods that are related to a query. Still yet another application can create associations between user-visible features in software and functions in the code. Such an application can extract characteristics of each function, and using traditional information retrieval techniques can find relationships between functions and features. In yet another example application that can be utilized in connection with the platform 100, information pertaining to past history of bugs fixed, regressions caused by fixes in the field, and test coverage information can be aggregated to quantify the risk versus benefit of fixing a bug. Such an application can provide aggregated and digested information from a variety of data sources using statistical techniques such as logistic regression. Of course, other example applications are contemplated and are intended to fall under the scope of the hereto-appended claims.

Figure 5:
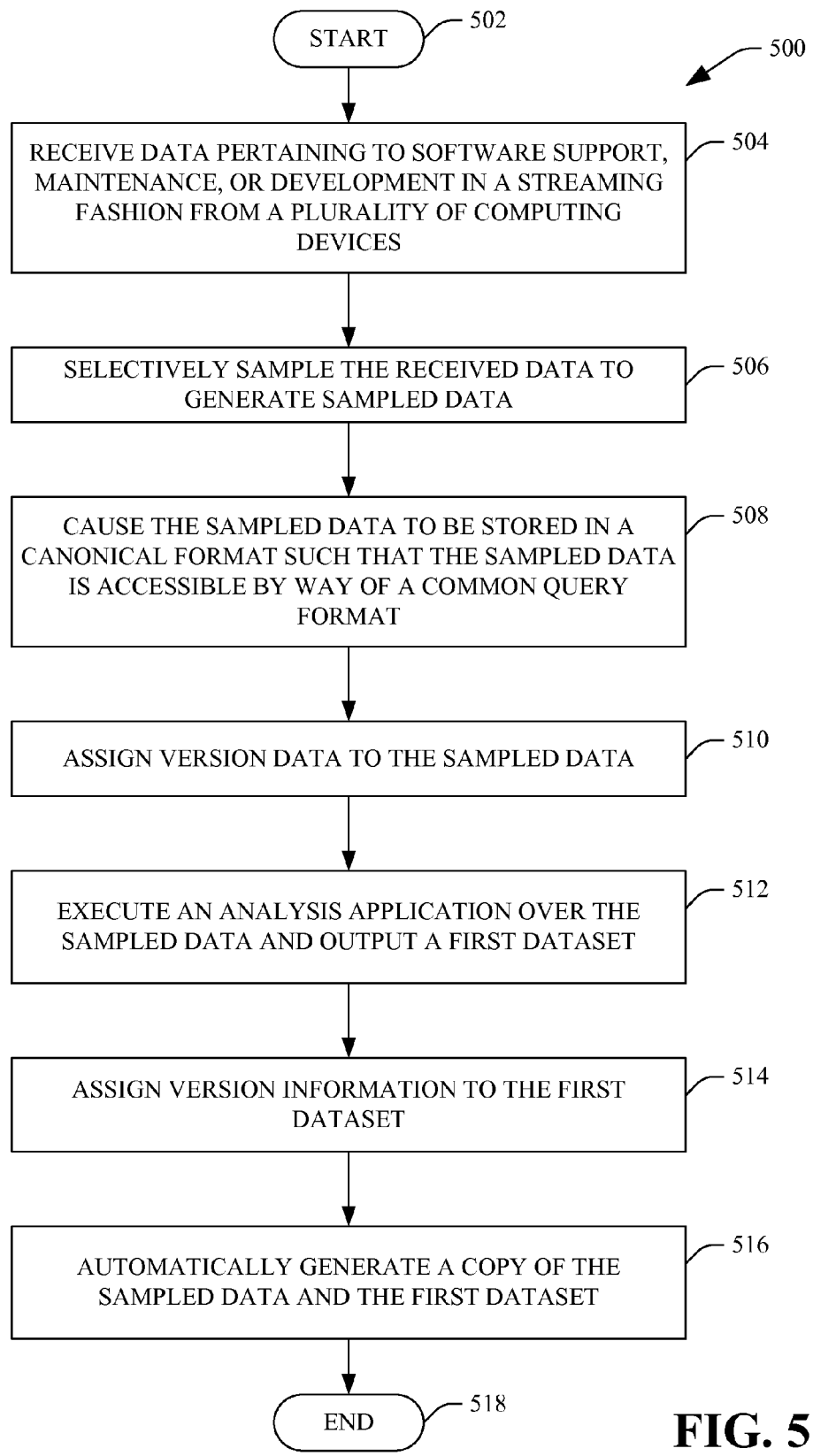
FIG. 5 is flow diagram that illustrates an example methodology for executing an analysis application over data made available by way of a platform that facilitates software development, maintenance, and/or support.

With reference now to FIG. 5, an example methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates utilizing a platform to perform analysis with respect to data pertaining to development, maintenance, and/or support of a software application is illustrated. The methodology 500 begins at 502, and at 504 data pertaining to software development, maintenance, or support is received in a streaming fashion from a plurality of computing devices. This data can include structured data such as binaries, bug reports, crash dumps, and the like, as well as unstructured data including but not limited to email, reports, word processing documents, etc.

At 506, the received data is selectively sampled to generate sampled data. At 508, the sampled data is caused to be stored in a canonical format such that the sampled data is accessible by way of a common query format. Various forms and/or schemas can be employed in connection with causing the data to be stored in a format that is accessible by way of a common querying format.

At 510, version data is assigned to the sampled data to indicate a version pertaining to the sampled data. At 512, an analysis application is executed over the sampled data and a first dataset is output upon executing the analysis application over the sampled data. At 514, version information is assigned to the first dataset to indicate a version pertaining to the first dataset, and at 516 a copy of the sampled data and the first dataset is generated, such that multiple copies of the sampled data and the first dataset are included in the data repositories. The methodology 500 completes at 518.

Figure 6:
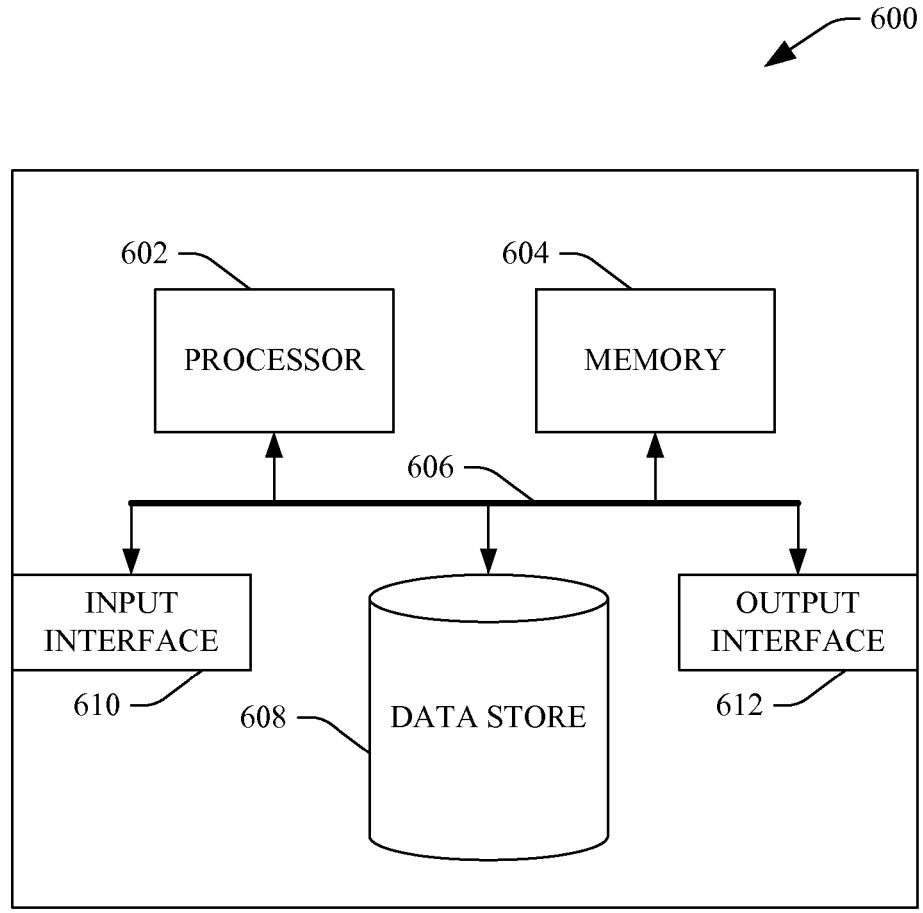
FIG. 6 is an example computing system.

Now referring to FIG. 6, a high-level illustration of an example computing device 600 that can be used in accordance with the systems and methodologies disclosed herein is illustrated. For instance, the computing device 600 may be used in connection with a platform that facilitates software development, maintenance, and/or support. In another example, at least a portion of the computing device 600 may be used in a system that supports requesting data from such a platform or transmitting data to such a platform. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store analysis data, source code, etc.

The computing device 600 additionally includes a data store 608 that is accessible by the processor 602 by way of the system bus 606. The data store 608 may include executable instructions, analysis data, relationship graphs, relational tables, etc. The computing device 600 also includes an input interface 610 that allows external devices to communicate with the computing device 600. For instance, the input interface 610 may be used to receive instructions from an external computer device, data from a personal computer, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A platform that facilitates software application development, maintenance, and support, the platform comprising:
at least one processor; and
memory that stores instructions that, when executed by the at least one processor, cause the at least one processor to perform acts comprising:
receiving, from a plurality of different computing devices located remotely from one another, structured data and unstructured data for a computer-executable application that is being developed;
assigning version information to the structured data and the unstructured data upon receipt of the structured data and the unstructured data;
causing the structured data and the unstructured data to be stored in a distributed fashion over a plurality of data repositories, the structured data comprises at least one of a bug report for the computer-executable application, a crash dump created during execution of the computer-executable application, or a binary of the computer-executable application, the unstructured data comprises an email that is assigned to the computer-executable application, wherein causing the structured data and the unstructured data to be stored comprises:
formatting the structured data; and
formatting the unstructured data, such that the structured data and the unstructured data, upon being formatted, are stored as canonical data having a common format;
executing an analytical process over the canonical data to generate a first dataset, wherein executing the analytical process comprises accessing a plurality of defined libraries; and
storing the first dataset in at least one data repository of the plurality of data repositories in a format that is accessible by a third party analysis program, the format being different from the common format.

2. The platform of claim 1, wherein the instructions are executed by a plurality of processors.

3. The platform of claim 1, the acts further comprising:
receiving data in a streaming fashion, the data being instrumentation data for the computer-executable application;
sampling the received data to generate sampled data; and
storing the sampled data in the data repositories such that the sampled data has the common format.

4. The platform of claim 1, wherein the format is a relational table that is stored across the plurality of data repositories.

5. The platform of claim 1, wherein the format is a relationship graph that is stored across the plurality of data repositories.

6. The platform of claim 1, the acts further comprising monitoring identities of individuals that have accessed portions of the canonical data in the plurality of data repositories.

7. The platform of claim 1, the acts further comprising:
executing a query over the first dataset; and
outputting a ranked list of bug data for the computer-executable application responsive to executing the query over the first dataset.

8. The platform of claim 7, the acts further comprising:
constructing usage protocols that describe how client code employs an Application Programming Interface.

9. The platform of claim 1, the acts further comprising enforcing privacy restrictions pertaining to the canonical data.

10. The platform of claim 1, the acts further comprising assigning a version to the first dataset.

11. The platform of claim 1, wherein the plurality of data repositories are located in separate countries.

12. The platform of claim 1, the acts further comprising executing a plurality of analysis programs in parallel over at least a subset of the canonical data in the plurality of data repositories.

13. The platform of claim 1, the acts further comprising generating multiple copies of the canonical data and storing the copies in different data repositories.

14. A computer-readable data storage device comprising instructions that, when executed by a processor, cause the processor to perform acts comprising:
receiving data pertaining to development of a computer-executable application from a plurality of computing devices, the data comprising structured data and unstructured data, the unstructured data comprising an email, the structured data comprising a bug report for the computer-executable application and a stack dump created when the computer-executable application caused a crash;
assigning version information to the data pertaining to development of the computer-executable application;
formatting the structured data and the unstructured data to generate canonical data, the canonical data accessible by way of a common query format;
causing the canonical data to be stored;
executing an analysis application over the canonical data and outputting a first dataset upon executing the analysis application over the canonical data, the first dataset having a format that is different than a format of the canonical data, wherein executing the analysis application comprises accessing a plurality of predefined libraries;
assigning version information to the first dataset to indicate a version of the first dataset; and
generating at least one copy of the canonical data and the first dataset.

15. A method executed by a processor of a computing device, the method comprising:
receiving structured data and unstructured data pertaining to development, maintenance, or support of a computer-readable code from a plurality of computing devices that are remotely located from one another,
the structured data comprising:
a bug report for a detected bug in the software application; and
a memory dump;
the unstructured data comprising an email authored by a developer of the software application;
assigning version information to the structured data and the unstructured data upon receipt of the structured data and the unstructured data;
formatting the structured data and the unstructured data in accordance with at least one schema, thereby causing the structured data and the unstructured data to be stored as canonical data that is distributed across data repositories in a common access format; and
executing an analytic process over the canonical data stored in the common access format to generate a relationship graph that is indicative of relationships between items in the structured data and the unstructured data, wherein executing the analytic process comprises accessing a plurality of predefined libraries.

16. The method of claim 15, wherein the relationship graph comprises a plurality of nodes and a plurality of edges, wherein nodes in the relationship graph represent data objects and edges between nodes in the relationship graph represent relationships between data objects represented by respective nodes coupled by the edges.

17. The method of claim 15, further comprising executing a third party application over the relationship graph to generate output data.

18. The method of claim 15, further comprising assigning version information to the relationship graph, the version information identifies a version of the relationship graph.

19. The method of claim 15, further comprising:
executing a query over the relationship graph; and
outputting a ranked list of bug data for the computer-executable application responsive to executing the query over the relationship graph.

20. The method of claim 1, further comprising:
executing a plurality of analysis programs in parallel over at least a subset of the canonical data in the plurality of data repositories.

* * * * *